United States Patent [19]

Rohde et al.

[11] Patent Number: 4,698,072
[45] Date of Patent: Oct. 6, 1987

[54] ADSORBER BED APPARATUS

[75] Inventors: Wilhelm Rohde, Munich; Hannsjorg Koch, Wolfratshausen; Michael Metschl, Penzberg, all of Fed. Rep. of Germany

[73] Assignee: Linde Aktiengesellschaft, Wiesbaden, Fed. Rep. of Germany

[21] Appl. No.: 865,718

[22] Filed: May 22, 1986

[30] Foreign Application Priority Data

May 22, 1985 [DE] Fed. Rep. of Germany ....... 3518367

[51] Int. Cl.$^4$ .............................................. B01D 53/04
[52] U.S. Cl. .......................................... 55/31; 55/33; 55/74; 55/75; 55/179; 55/387; 55/389
[58] Field of Search ................. 55/30, 31, 33, 35, 179, 55/316, 387, 389, 233

[56] References Cited

U.S. PATENT DOCUMENTS

| | | | |
|---|---|---|---|
| 2,127,645 | 8/1938 | Kinney et al. | 55/233 X |
| 2,190,168 | 2/1940 | Armistead | 55/179 X |
| 2,622,414 | 12/1952 | Jaubert | 55/179 X |
| 3,119,673 | 1/1964 | Asker et al. | 55/31 X |
| 3,841,058 | 10/1974 | Templeman | 55/33 |
| 4,259,097 | 3/1981 | Patel et al. | 55/316 |
| 4,266,952 | 5/1981 | Turek | 55/179 |
| 4,304,577 | 12/1981 | Ito et al. | 55/179 |
| 4,544,384 | 10/1985 | Metschl et al. | 55/179 X |

FOREIGN PATENT DOCUMENTS

| | | | |
|---|---|---|---|
| 3342447 | 5/1984 | Fed. Rep. of Germany | 55/179 |
| 137431 | 7/1985 | Japan | 55/387 |
| 2076690 | 12/1981 | United Kingdom | 55/387 |

Primary Examiner—Robert Spitzer
Attorney, Agent, or Firm—Millen & White

[57] ABSTRACT

A space and energy saving adsorber unit comprising two adsorber beds arranged in a common housing. The upper adsorber bed, disposed essentially vertically, is contained by gas permeable vertical walls, thereby permitting gas to be treated in the horizontal direction. The second adsorber bed, located beneath the first bed, slopes downwardly from an upper apex with increasing distance from a vertical central axis and is also enclosed, at least in part, by gas permeable walls. During regeneration of the system where water might be condensed in the bed, the condensate flows out of the bed without damaging the adsorbent.

25 Claims, 1 Drawing Figure

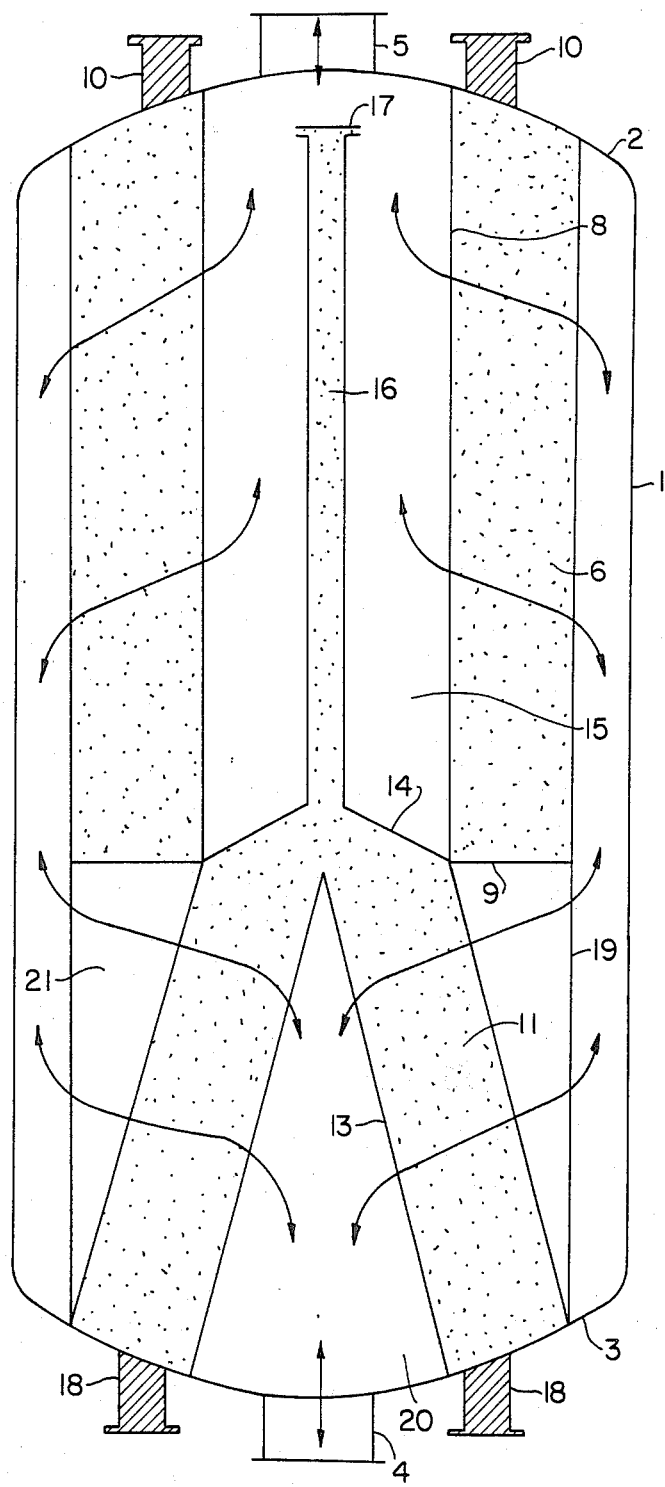

ADSORBER BED APPARATUS

BACKGROUND OF THE INVENTION

The invention relates to an adsorber unit containing at least two adsorber beds arranged in a common housing and to a process of using said unit.

DESCRIPTION OF THE PRIOR ART

In the simultaneous adsorptive separation of two or more components from a gaseous stream, it is conventional to provide different adsorber beds for each distinct, but different, strongly adsorbable component or group of components. During loading of the previously regenerated adsorbent bed, an adsorption front is formed within an adsorber bed for each component, this front advancing at a speed which varies as a function of the relative adsorbability of the particular component to be adsorbed. The components of weaker adsorbability, the adsorption fronts of which progress more rapidly than the more strongly adsorbable components, not only circulate faster through the adsorber bed, i.e., occur first in the unadsorbed product stream, but these components are also more easily displaced from the adsorber bed by the more strongly adsorbable components during progression of the adsorption fronts pertaining to these components. Thus, a number of different zones form in the loaded adsorber, which zones are loaded with the various components. By proper dimensioning, it is thus possible to construct adsorber units having different beds in which upon complete loading in the individual beds, essentially only a single component or a single group of components is adsorbed. Subdivision of the adsorber unit into various beds can be desirable for several reasons, e.g., for space savings, or for facilitating regeneration of the loaded adsorber beds.

DOS No. 3,342,447 describes an adsorber unit of this type which is suitable, for example, for the drying and separation of carbon dioxide from air, or for the purification and/or fractionation of natural gas, wherein water and hydrocarbons are to be separated. For these purposes, DOS No. 3,342,447 discloses two different embodiments of the adsorber unit, the second adsorber bed being, in one case, designed as a vertical extension of the first adsorber bed, being separated from the first adsorber bed by only a partition and, in the other case, as a horizontally arranged, separate bed. However, these conventional designs exhibit several drawbacks: Although the embodiment disclosing a vertical extension of the first adsorber bed results in a desirable, large cross section of the adsorber bed, from which pressure losses of the gas to be purified and/or to be fractionated can be kept at low values, it is impossible therein to effect a separate recharging of the adsorbent in only one of the two adsorber beds. Even more serious is the problem which results, e.g., in the drying of moist gases if water is adsorbed in the lower adsorber bed. In this case, wherein thermal regeneration is generally employed, a hot stream of regenerating gas enters the upper adsorber bed during regeneration and passes through the bed countercurrently to the adsorption direction; this hot stream initially transfers its heat to the charge in the upper adsorber bed and subsequently passes, in a cooler state, through the lower adsorber bed and exits via the regenerating gas outlet. After some time, the thermal front progresses into the lower bed wherein the water has been adsorbed, and the regenerating gas at elevated temperature takes up water. In the subsequent zone of adsorbent packing, which is still cold, the now moist, regenerating gas is cooled off, and the water is condensed, dropping, under the force of gravity, i.e., perpendicular to the flow direction of the gas. This means that increasing amounts of water can accumulate in the lower adsorber bed after several cycles in the lower portion of the adsorber bed under economical regeneration, i.e. with the use of a minimum of heating energy. In order to prevent this from happening, regeneration must be performed with increased amounts of regenerating energy present in the lower zones.

Although this undesirable effect does not occur in the horizontal arrangement of the lower bed, the horizontal construction also exhibits several disadvantages. For example, it is necessary to clamp the adsorbent packing in place in order to avoid turbulence during operation. Consequently, charging this adsorber bed with adsorbent, and particularly replenishing exhausted adsorbent is very expensive. Furthermore, when in such a location, the lower adsorber bed normally has a smaller cross section of adsorber bed available than in the case of a vertical location, and thus it is necessary either to tolerate shorter cycle times or to increase the layer thickness and thus the pressure loss of the gas to be purified and/or fractionated.

OBJECTS OF THE INVENTION

Accordingly, it is an object, in one aspect of the invention, to provide an improved adsorber unit of the aforementioned type so as to ameliorate the aforementioned disadvanages, and in another aspect to provide an adsorption process based on the improved adsorber unit.

Upon further study of the specification and appended claims, further objects and advantages of this invention will become apparent to those skilled in the art.

SUMMARY OF THE INVENTION

These and other objects have been attained, in an apparatus aspect, in an adsorber unit having two adsorber beds arranged in a common housing, in which a first adsorber bed is enclosed by substantially vertical and parallel gas-permeable walls, so that a substantially horizontal gas flow can occur in the first adsorber bed, and wherein a second adsorber bed is arranged below and in flow communication with the first adsorber bed, the improvement comprising said second adsorber bed being arranged so that it has an upper apex lying in a vertical central axis or axis of symmetry, and said second adsorber bed having descending flanks which slope in the downward direction with increasing distance from the central axis, said descending flanks being at least partially enclosed by gas-permeable walls.

DETAILED DISCUSSION

The structure of the adsorber unit fabricated in accordance with the teachings of this invention enables the second adsorber bed to be arranged neither horizontally nor vertically to the first cohoused, adsorber bed. Instead, it is arranged with an upper apex lying in a vertical central axis and inclination between this central, highest elevation and a lower, wider zone located within the housing. This type of construction enables a compact, space-saving disposition of the adsorbent. Furthermore, this construction facilitates recharging of the adsorbent of the second, lower adsorber bed since for this purpose sealable exhaust pipes need only be provided, i.e., located in the zone of the support means at the housing. Charging of the second adsorber bed with fresh adsorbent effectively takes place by way of a charging pipe, the opening of which extends from the upper region of the housing to the apex of the second adsorber bed.

Owing to the inclined angle of bed construction, the charged adsorbent slides securely into the adsorber bed and results, without any additional levelling devices, such as are required with horizontally arranged adsorber beds, in a substantially uniform and complete filling of the second adsorber bed. Generally, on average, the angle between the inclined bed and the vertical axis of adsorber is about 5 to 15, preferably 7 to 12, most preferably about 7° to 8°.

In another embodiment of the adsorber unit of this invention, the second adsorber bed exhibits, in the zone of the descending flanks, a substantially constant adsorber layer thickness, e.g., about 200 to 600 mm, preferably 300 to 400 mm, in order to ensure uniform flow-through of the gas to be purified and/or fractioned, as well as the regenerating gas passing through the flanks.

In the broadest aspect of the apparatus of the invention, the cross section of the second adsorber bed can be of any desired configuration including, for example, a hemisphere or a semiellipsoid. For reasons of structural simplicity, it is preferred in many cases to construct the second adsorber bed so that it has an essentially wedge-shape vertical cross section.

Also in horizontal cross section, the second adsorber bed can be designed in many different forms and can be adapted to the housing cross section. Since the housing in most practical instances will be a vertical, cylindrical container, a rotationally symmetrical arrangement of the second adsorber bed about a vertical central axis is an especially advantageous design.

In the process aspect of the invention, the gas to be treated is first passed through the inclined bed and then through the vertical bed.

BRIEF DESCRIPTION OF THE DRAWINGS

FIG. 1 discloses a simplified vertical cross sectional view of a preferred embodiment of the adsorber unit housing which, with respect to a vertical central axis, is a rotationally symmetrical arrangement.

DETAILED DESCRIPTION OF THE DRAWINGS

The adsorber unit set forth in the FIG. 1 is disposed within a housing comprising a vertically disposed cylindrical jacket 1, a dished head 2 and a dished bottom 3. The dished bottom 3 has a centrally located connecting nipple 4 positioned therein for the entrance of the gas stream to be cleaned and/or for the discharge of the regenerating gas. In similar fashion, the dished head 2 contains a centrally located nipple 5 for the exhaust of the unadsorbed product gas component and/or for the entrance of regenerating gas. A first elongated adsorber bed 6 is positioned in the upper zone of the housing and is in gastight communication with the dished head 2. This adsorber bed extends in an annular arrangement by elongated vertical, gas-permeable walls 7 and 8 as well as by a gas-impermeable lower partition 9. Sealable nipples 10 for filling the adsorber bed 6 with adsorbent are provided in the dished head 2 in the zone where the adsorber bed 6 is in contact therewith. When exchanging adsorbent, the exhausted adsorbent is also discharged through these nipples 10, for example, by suction.

The second adsorber bed 11 is located vertically beneath the adsorber bed 6. This adsorber bed 11 is supported on the dished bottom 3 and is defined by obliquely extending gas-permeable walls 12, 13. The gas permeable wall 13 forms what is essentially a rotationally symmetrical cone arranged centrally i.e., along the vertical central axis within the cylindrical jacket 1. The external wall 12 surrounds the cone formed by the internal wall 13 by forming a truncated cone extending concentrically thereto, which terminates at the junction between the lower partition 9 and the gas-permeable wall 8 of the upper adsorber bed. The lower adsorber bed 11 is separated from the interior 15 of the upper adsorber bed by means of gastight partitions 14.

A central pipe 16 leads from the apex of the lower adsorber bed 11 into the upper region of the housing and terminates in a blind flange 17 just beneath the dished head 2, and below the nipple 5. By opening the blind flange 17, adsorbent can be easily charged via the pipe 16 into the lower adsorber bed 11. For the withdrawal of exhaust adsorbent, sealable nipples 18 are provided in the zone of dished bottom 3, being located in the region of the surface supporting the adsorber bed 11.

The gas-permeable wall 7 of the upper adsorber bed 6 extends, for reasons of mechanical stability, past the zone containing adsorber bed 6 and continues as a gas-permeable, cylindrical supporting wall 19 positioned concentrically to the jacket 1 through the housing and rests on the lower dished bottom 3. The gas permeable walls may consist, for example of perforated plates as supporting means on which wire mesh is arranged.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

The mode of operation of the adsorber unit of this invention will be explained, using an air purification process as an example, which is conducted, e.g., prior to a low-temperature air fractionation. During the preliminary purification stage, moisture and carbon dioxide, as well as any hydrocarbons that may be present, are removed from the air.

In an adsorption phase, the air is fed to the adsorber unit via nipple 4. In the lower adsorber bed 11, containing a drying gel, e.g., silica gel or a molecular sieve, the moisture present in the air is substantially adsorbed. The gas passes during this phase from the conical space 20 defined by the wall 13 into an annular space 21 defined by the walls 12, 7 and 9, as well as the jacket 1, and thereafter flows through the upper adsorber bed 6 in the horizontal direction to be finally exhausted, after accumulation in the inner chamber 15, via the nipple 5 in the dished head 2. The upper adsorber bed 6 contains a conventional zeolitic molecular sieve for the removal of carbon dioxide, as well as for removing any hydrocarbons which may be present.

When the adsorber unit becomes loaded, generally after a relatively long operating period, e.g. after 6–12 hours, the air feed is cut off. Then in a second process cycle, a regenerating gas, e.g. nitrogen, is fed via the nipple 5 countercurrently to the previous flow direction. The regenerating gas first flows through the upper adsorber bed 6, during which time it takes up, in the gaseous phase, carbon dioxide and any hydrocarbons present. Subsequently it flows through the lower adsorber bed 11 and therein takes up the moisture. Finally, the exiting regenerating gas is exhausted via nipple 4. If during regenerating a portion of the desorbed moisture recondenses in the lower adsorber bed 11 on layers of adsorbent that have not as yet been heated, the thus-formed liquid flows along a relatively short path to the outlet end of the adsorber bed 11, i.e. to the gas-permeable wall 13, and can be readily drained off at that location. An accumulation of water within the adsorber bed 11 that would damage the adsorbent does not occur during this step as long as the opening angle of the cone encompassed by the wall 13 is not too small, i.e., if this opening angle is at least 10° or stated in another way the angle between the inclined wall and the vertical is at least 5°.

The adsorber unit of this invention can be utilized in a large number of adsorption processes. On account of the compact structure, the unit is particularly suitable in cases where otherwise problems can occur with structural sizes of adsorbers on account of high gas throughputs. For example, gas quantities of several 100,000 $Nm^3/h$ must be purified by adsorption upstream of large low-temperature air fractionation plants. In order to be able to operate the adsorbers with industrially feasible cycle times, it is necessary to use adsorbers having a structural height of, e.g., 12 meters and a diameter of, e.g., 5 meters, typically exhibiting adsorption bed volumes of about e.g., 10 $m^3$, wherein, e.g., up to one-third of the entire volume is designed for the lower adsorber bed 6 to be loaded with water.

The preceding examples can be repeated with similar success by substituting the generically or specifically described reactants and/or operating conditions of this invention for those used in the preceding examples.

The embodiments of the invention in which an exclusive property or privelege is claimed are as follows:

1. In an adsorber unit having two adsorber beds arranged in a common housing, in which a first adsorber bed is enclosed by elongated gas-permeable walls that are disposed substantially vertically and in mutual opposition thereto, so that a substantially horizontal gas flow can occur in the first adsorber bed, and wherein a second adsorber bed is arranged below and in flow communication with the first adsorber bed, wherein the improvement comprises said first adsorber bed being fabricated in the form of an annular cylinder, the interior of which is in communication with a conduit means for feeding and/or discharging gas, said annular cylinder being arranged coaxially to said second adsorber bed; said second adsorber bed being arranged so that it has an upper apex lying in a vertical central axis and descending flanks which slope in the downward direction with increasing distance from the central axis, said second adsorber bed being rotationally symmetrical about said vertical central axis, said descending flanks being at least partially enclosed by gas-permeable walls, said second adsorber bed having a substantially constant adsorber layer thickness in the region of the descending flanks; and a charging pipe being positioned within said common housing leading from the apex of said second adsorber bed through the interior of said first adsorber bed into an upper zone of said common housing.

2. An adsorber unit according to claim 1, wherein the second adsorber bed as a substantially wedge-shaped cross section.

3. An adsorber unit according to claim 2, wherein the second adsorber bed is arranged to be rotationally symmetrical about said vertical central axis.

4. An adsorber unit according to claim 1, wherein an exhaust pipe leads from the lower zone of the second adsorber bed through the housing.

5. An adsorber unit according to claim 1, wherein the slope of the descending flanks is at an angle of at least about 20°.

6. An adsorber unit according to claim 1, wherein the second adsorber unit is in the form of a hemisphere.

7. An adsorber unit according to claim 1, wherein the second adsorber unit is in the form of a semiellipsoid.

8. An adsorber unit according to claim 1, wherein the descending flanks slope from the central axis at an angle of about 5°–15°.

9. An adsorber unit according to claim 1, wherein the descending flanks slope from the central axis at an angle of about 7°–12°.

10. An adsorber unit according to claim 1, wherein the descending flanks slope from the central axis at an angle of about 7°–8°.

11. An adsorber unit according to claim 1, wherein the adsorber layer thickness in the region of the descending flanks is about 200–600 mm.

12. An adsorber unit according to claim 1, wherein the adsorber layer thickness in the region of the descending flanks is about 300–400 mm.

13. An adsorber unit according to claim 1, wherein said common housing has a dished bottom which forms an opening angle with said second adsorber zone of at least 10°.

14. An adsorber unit according to claim 1, wherein said second adsorber bed is defined by inclined inner and outer gas-permeable walls, said inner wall forming an angle of at least 5° with the vertical.

15. An adsorption process comprising passing gas-to-be-treated through the apparatus of claim 1, first through the second adsorber bed and then through the first adsorber bed.

16. An adsorption process according to claim 15 wherein the gas-to-be-treated is air and the adsorption removes $H_2O$, $CO_2$, and hydrocarbon.

17. An adsorption process according to claim 16, wherein said second adsorber bed contains silica gel or molecular sieves.

18. An adsorption process according to claim 15, further comprising regenerating said first and second adsorber beds after the adsorber unit has become loaded, said adsorber unit being regenerated by conducting a regeneration gas first through the first adsorber bed and then through the second adsorber bed.

19. In an adsorber unit having two beds arranged in a common housing, in which a first adsorber bed is enclosed by elongated gas-permeable walls that are disposed substantially vertically and in mutual opposition thereto, so that a substantial horizontal gas flow can occur in the first adsorber bed, and wherein a second adsorber bed is arranged below and in fluid communication with the first adsorber bed, wherein the improvement comprises said second adsorber bed being arranged so that it has an upper apex lying in a vertical central axis and descending flanks which slope in the downward direction with increasing distance from the central axis, said descending flanks being at least partially enclosed by gas-permeable walls, and a central pipe being positioned within said common housing leading from the apex of said second adsorber bed through the interior of said first adsorber bed into an upper zone of said common housing.

20. An adsorber unit according to claim 19, wherein the second adsorber bed has a substantially constant adsorber layer thickness in the region of the descending flanks.

21. An adsorber unit according to claim 19, wherein the second adsorber bed is arranged to be rotationally symmetrical about said vertical central axis.

22. An adsorber unit according to claim 21, wherein the first adsorber bed is fabricated in the form of an annular cylinder, the interior of which is in communication with a conduit means for feeding and/or discharging gas, said annular cylinder being arranged coaxially to the second adsorber bed.

23. An adsorber unit according to claim 21, wherein the first adsorber bed is fabricated in the form of an annular cylinder, the interior of which is in communication with a conduit means for feeding and/or discharging gas, said annular cylinder being arranged coaxially to the second adsorber bed.

24. An adsorber unit according to claim 19, wherein the first adsorber bed is fabricated in the form of an annular cylinder, the interior of which is in communication with a conduit means for feeding and/or discharging gas, said annular cylinder being arranged coaxially to the second adsorber bed.

25. An adsorber unit according to claim 19, wherein the second adsorber bed has a substantially wedge-shaped cross section.

* * * * *